United States Patent
Prasad et al.

(10) Patent No.: US 10,455,636 B2
(45) Date of Patent: Oct. 22, 2019

(54) LINK PACKING IN MMWAVE NETWORKS

(71) Applicant: NEC Laboratories America, Inc., Princeton, NJ (US)

(72) Inventors: Narayan Prasad, Willow Grove, PA (US); Mohammad Khojastepour, Lawrenceville, NJ (US); Sampath Rangarajan, Bridgewater, NJ (US); Yasaman Ghasempour, Houston, TX (US)

(73) Assignee: NEC Corporation (JP)

( * ) Notice: Subject to any disclaimer, the term of this patent is extended or adjusted under 35 U.S.C. 154(b) by 106 days.

(21) Appl. No.: 15/678,681

(22) Filed: Aug. 16, 2017

(65) Prior Publication Data

US 2018/0084600 A1  Mar. 22, 2018

Related U.S. Application Data

(60) Provisional application No. 62/395,561, filed on Sep. 16, 2016.

(51) Int. Cl.
| | |
|---|---|
| H04W 76/04 | (2009.01) |
| H04W 76/20 | (2018.01) |
| H04W 24/08 | (2009.01) |
| H04B 17/336 | (2015.01) |

(52) U.S. Cl.
CPC .......... *H04W 76/20* (2018.02); *H04B 17/336* (2015.01); *H04W 24/08* (2013.01)

(58) Field of Classification Search
CPC ..... H04W 76/04; H04W 24/08; H04W 24/10; H04W 72/085
See application file for complete search history.

(56) References Cited

U.S. PATENT DOCUMENTS

| | | | | |
|---|---|---|---|---|
| 8,510,433 | B2 * | 8/2013 | Ramachandran .... | H04B 7/0695 455/464 |
| 8,818,278 | B2 * | 8/2014 | Levy ..................... | H04W 8/005 455/41.2 |
| 10,165,426 | B1 * | 12/2018 | Jiang ..................... | H04W 16/28 |

(Continued)

OTHER PUBLICATIONS

Adhikary et al., "JSDM and Multi-Cell Networks: Handling Inter-Cell Interference Through Long-Term Antenna Statistics," 48th Asilomar Conference on Signals, Systems and Computers. Nov. 2-5, 2014. pp. 649-655.

(Continued)

*Primary Examiner* — Parth Patel
(74) *Attorney, Agent, or Firm* — Joseph Kolodka

(57) ABSTRACT

A computer-implemented method for establishing communication links in a millimeter wave (mmWave) network by solving a linear integer packing problem is presented. The computer-implemented method includes determining active communication links between a plurality of transmitters and a plurality of receivers, setting each active communication link to have any arbitrary chosen weight or priority, and setting a minimum link quality threshold for each active communication link and subjecting each active communication link to constraints. Detected phantom constraints are mitigated by introducing new constraints with binary coefficients and by modifying one or more existing constraints by setting a number of coefficients within the existing constraints to zero.

18 Claims, 3 Drawing Sheets

(56) References Cited

U.S. PATENT DOCUMENTS

| | | | | |
|---|---|---|---|---|
| 2011/0263214 | A1* | 10/2011 | Robinson | H04B 1/006 455/88 |
| 2012/0243638 | A1* | 9/2012 | Maltsev | H04W 72/0453 375/316 |
| 2013/0286960 | A1* | 10/2013 | Li | H04W 72/042 370/329 |
| 2014/0073337 | A1* | 3/2014 | Hong | H04W 16/28 455/452.1 |
| 2015/0358957 | A1* | 12/2015 | Kim | H04W 16/32 455/450 |
| 2016/0057687 | A1* | 2/2016 | Horn | H04W 24/10 370/331 |
| 2016/0198474 | A1* | 7/2016 | Raghavan | H04W 72/0466 370/335 |
| 2016/0254937 | A1* | 9/2016 | Bayesteh | H04L 1/0054 375/341 |
| 2016/0255613 | A1* | 9/2016 | Faerber | H04W 16/10 370/330 |
| 2016/0269087 | A1* | 9/2016 | Subramanian | H04B 7/024 |
| 2016/0323888 | A1* | 11/2016 | Ryu | H04B 1/10 |
| 2016/0353424 | A1* | 12/2016 | Stirling-Gallacher | H04B 7/0626 |
| 2017/0208525 | A1* | 7/2017 | Takahashi | H04B 7/0408 |
| 2017/0244451 | A1* | 8/2017 | Raghavan | H04B 7/0408 |
| 2017/0251518 | A1* | 8/2017 | Agiwal | H04W 24/08 |
| 2017/0295502 | A1* | 10/2017 | Stirling-Gallacher | H04W 16/28 |
| 2017/0303286 | A1* | 10/2017 | Sang | H04W 76/15 |
| 2017/0311187 | A1* | 10/2017 | Dong | H04B 7/024 |
| 2017/0331577 | A1* | 11/2017 | Parkvall | H04J 11/0079 |
| 2017/0331670 | A1* | 11/2017 | Parkvall | H04W 52/0274 |
| 2017/0332433 | A1* | 11/2017 | Garcia | H04L 1/0015 |
| 2018/0020382 | A1* | 1/2018 | Kim | H04W 36/0055 |
| 2018/0054790 | A1* | 2/2018 | Islam | H04B 7/0408 |
| 2018/0074181 | A1* | 3/2018 | Kishigami | G01S 7/282 |
| 2018/0084600 | A1* | 3/2018 | Prasad | H04W 24/08 |
| 2018/0132158 | A1* | 5/2018 | Tseng | H04W 76/27 |
| 2018/0132252 | A1* | 5/2018 | Islam | H04W 72/046 |
| 2018/0176747 | A1* | 6/2018 | Li | H04L 29/08576 |
| 2018/0176869 | A1* | 6/2018 | Aryafar | H04W 76/10 |
| 2018/0205435 | A1* | 7/2018 | Nair | H04B 7/0695 |
| 2018/0213415 | A1* | 7/2018 | Khojastepour | H04B 7/02 |
| 2018/0219587 | A1* | 8/2018 | Huo | H04B 1/40 |
| 2018/0234157 | A1* | 8/2018 | Liang | H04B 7/0695 |
| 2018/0262918 | A1* | 9/2018 | Zhao | H04B 7/0482 |
| 2018/0270016 | A1* | 9/2018 | Mueck | H03M 13/616 |
| 2018/0359069 | A1* | 12/2018 | Nam | H04L 5/0048 |
| 2018/0367999 | A1* | 12/2018 | Barberis | H04W 16/10 |
| 2019/0013847 | A1* | 1/2019 | Kim | H04B 7/0617 |
| 2019/0029049 | A1* | 1/2019 | Akkarakaran | H04W 74/0833 |
| 2019/0104465 | A1* | 4/2019 | Sakoda | H04W 48/16 |

OTHER PUBLICATIONS

Adhikary et al., "Joint Spatial Division and Multiplexing for mm-Wave Channels," IEEE Journal on Selected Areas in Communications. vol. 32, No. 6. Jun. 2014. pp. 1239-1255.

Alkhateeb et al., "Hybrid Precoding for Millimeter Wave Cellular Systems with Partial Channel Knowledge," Information Theory and Applications Workshop. Feb. 10-15, 2013. pp. 1-5.

Goussevskaia et al., "Algorithms for Wireless Capacity," IEEE/ACM Transactions on Networking, vol. 22. No. 3. Jun. 2014. pp. 745-755.

Kesselheim et al., "A Constant-Factor Approximation for Wireless Capacity Maximization with Power Control in the SINR Model," Computer Science—Networking and Internet Architecture. Aug. 27, 2010. pp. 1-17.

Michaloliakos et al., "Joint user-beam selection for hybrid beamforming in asynchronously coordinated multi-cell networks," Information Theory and Applications Workshop. Jan. 31-Feb. 5, 2016. pp. 1-10.

* cited by examiner

LINK PACKING IN MMWAVE NETWORKS

RELATED APPLICATION INFORMATION

This application claims priority to Provisional Application No. 62/395,561, filed on Sep. 16, 2016, incorporated herein by reference in its entirety.

BACKGROUND

Technical Field

The present invention relates to millimeter wave (mmWave) communication technology and, more particularly, to link packing in mmWave networks.

Description of the Related Art

Millimeter-wave communication technology refers to a technology using an electromagnetic wave whose wavelength is one centimeter to one millimeter (corresponding to a frequency range of 30 GHz to 300 GHz) to communicate. Currently, civil millimeter wave communication technology mainly uses a spectrum whose frequency band is about 60 GHz. The biggest advantage of 60 GHz technology is very wide transmission bandwidth and in a vicinity of 60 GHz it can provide up to 5 GHz transmission bandwidth, where an occupied working frequency can be used without authorization. Because the electromagnetic spectrum is a strong absorption peak close to the 60 GHz range, electromagnetic wave propagation decay in this frequency range is very large, and thus a typical transmission distance of the 60 GHz communication technology is no more than 10 meters. This electromagnetic propagation property not only defines that the application scenario of the 60 GHz communication technology is primarily an indoor environment, but also makes spatial multiplexing become possible.

SUMMARY

A computer-implemented method for establishing communication links in a millimeter wave (mmWave) network by solving a linear integer packing problem is presented. The method includes determining active communication links between a plurality of transmitters and receivers, setting each active communication link to have any arbitrary chosen weight or priority, and setting a minimum link quality threshold for each active communication link and subjecting each active communication link to constraints. Detected phantom constraints are mitigated by introducing new constraints with binary coefficients and by modifying one or more existing constraints by setting a number of coefficients within the existing constraints to zero.

A system for establishing communication links in a millimeter wave (mmWave) network by solving a linear integer packing problem is presented. The system includes a memory and a processor in communication with the memory, wherein the processor is configured to determine active communication links between a plurality of transmitters and receivers, set each active communication link to have any arbitrary chosen weight or priority, and set a minimum link quality threshold for each active communication link and subjecting each active communication link to constraints. Detected phantom constraints are mitigated by introducing new constraints with binary coefficients and by modifying one or more existing constraints by setting a number of coefficients within the existing constraints to zero.

A non-transitory computer-readable storage medium including a computer-readable program for establishing communication links in a millimeter wave (mmWave) network by solving a linear integer packing problem is presented, wherein the computer-readable program when executed on a computer causes the computer to perform the steps of determining active communication links between a plurality of transmitters and receivers, setting each active communication link to have any arbitrary chosen weight or priority, and setting a minimum link quality threshold for each active communication link and subjecting each active communication link to constraints. Detected phantom constraints are mitigated by introducing new constraints with binary coefficients and by modifying one or more existing constraints by setting a number of coefficients within the existing constraints to zero.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
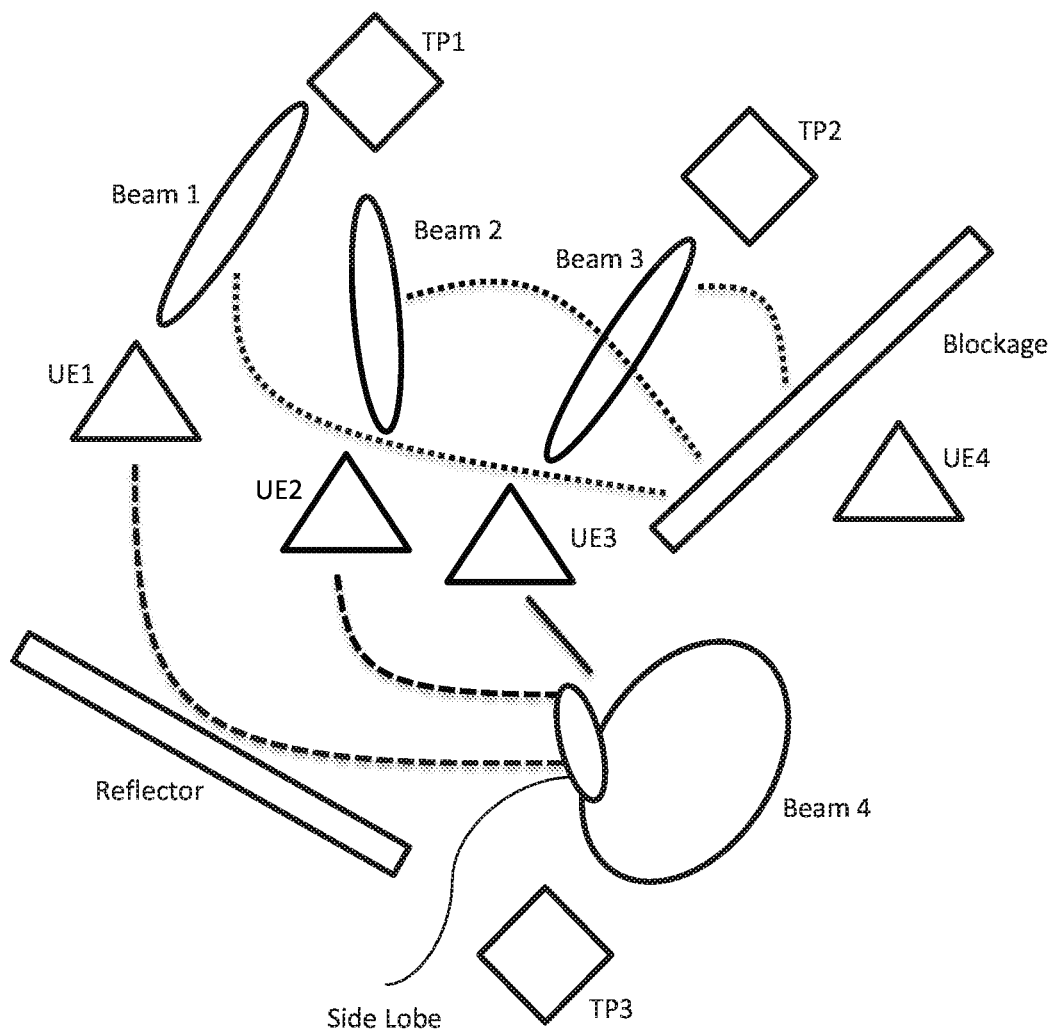
FIG. 1 is a block/flow diagram illustrating a millimeter wave network, in accordance with embodiments of the present invention.

In the exemplary embodiments of the present invention, link packing for millimeter wave (mmWave) networks is presented. Each link is a 4-tuple determined by a choice of receiving user, transmitting access point, transmit beamforming vector, and receive beamforming vector. The exemplary embodiments of the present invention seek to optimize a weighted sum over active communication links, where each communication link is permitted to have any arbitrarily chosen weight or priority and where an active communication link satisfies a minimum link quality threshold. The formulation models a scenario where blockages due to arbitrarily placed obstacles in a propagation environment are allowed to occur, where it is noted that mmWave transmissions are susceptible to blockages. This is a departure from classical link packing problems where only a signal attenuation based on propagation distance is modeled. The exemplary embodiments of the present invention exploit a sparsity induced by a directional nature of propagation due to beamforming and significant signal attenuation due to high path penetration and reflection losses. The exemplary embodiments of the present invention exploit this sparsity to express link quality constraints as packing constraints.

In the exemplary embodiments of the present invention, a general link packing problem for millimeter wave (mm- Wave) networks is formulated by maximizing a weighted sum of active communication links, where a communication link is formed by receiving user information, transmitting nodes or points (TP), and transmit and receive beamformers. All active communication links meet a minimum signal-to-interference-plus-noise ratio (SINR) threshold and are subject to other constraints.

An imposed practical constraint can include a "one datastream" per scheduled user constraint. Justification is that a number of radiofrequency (RF) chains at any user is one.

Another imposed practical constraint can include dimensionality constraints where there is a limit on a number of active links sharing the same TP and there is a limit on a number of streams assigned to the same (TP, transmit beam) pair. This is accomplished by exploiting sparsity in mmWave networks by manipulating highly directional transmission and by manipulating limited diffraction, high path penetration, and reflection losses. A feature of the formulated problem involves allowing for arbitrary blockages and not making assumptions on channel gains in order to design deterministic low-complexity algorithms with performance guarantees.

In the exemplary embodiments of the present invention, an iterative algorithm or method is constructed that considers an alternate formulation which is a column sparse binary packing problem. The method outperforms other heuristics and guarantees a constant factor approximation for input instances that are likely to occur in mmWave networks. The exemplary embodiments of the present invention can be used to improve spectral efficiency by allowing more communication links to simultaneously co-exist and can be used to improve revenue by determining a large set of high priority communication links that can simultaneously co-exist.

FIG. 1 is a block/flow diagram illustrating a millimeter wave network, in accordance with embodiments of the present invention.

A plurality of users (UE1, UE2, UE3, UE4) are located within a mmWave network or propagation environment. Transmit and receive beams (Beam 1, Beam 2, Beam 3) are transmitted between the plurality of users and transmission points (TP1, TP2, TP3). A blockage may be present within the mmWave network such that it blocks beams 1, 2, 3 from being received by the user (UE4).

The mmWave system can be described as follows: Let U be a set of users and B denote a set of transmission points (TPs). For simplicity, it is assumed that each user is equipped with Nr receive antennas and each TP is equipped with Nt transmit antennas. Let W and V denote the codebook of transmit analog beamforming vectors used by each TP and a codebook of analog receive beamforming vectors used by each user, respectively. Each vector in W is a Nt×1 unit norm vector with constant-magnitude elements, whereas each vector in V is a Nr×1 unit norm vector with constant-magnitude elements.

Let $x_{u,v,b,w}$ be an indicator variable that is one if user $u \in \mathcal{U}$ is scheduled to receive data using receive beam vector $v \in \mathcal{V}$ whereas the data for that user is transmitted by $b \in B$ using transmit beam vector $w \in \mathcal{W}$, and zero otherwise.

Henceforth the following 4-tuple is used:

$$(u,v,b,w), \forall u \in \mathcal{U}, b \in B, v \in \mathcal{V}, w \in \mathcal{W},$$

This represents the aforementioned link, with $\theta_{u,v,b,w} > 0$ denoting its weight or priority. Thus, $x_{u,v,b,w} = 1$ implies that the communication link is active, while $x_{u,v,b,w} = 0$ implies otherwise.

The corresponding link SINR, sinr(u, v, b, w), is defined as:

$$\frac{x_{u,v,b,w} P \|v^\dagger H_{u,b} w\|^2}{1 + \sum_{\substack{u' \in u, b' \in B, v' \in v, w' \in w \\ (u',v',b',w') \neq (u,v,b,w)}} x_{u',v',b',w'} P \|v^\dagger H_{u,b'} w'\|^2}, \quad (1)$$

where P>0 is a transmit power per beam and $H_{u,b}$, $\forall u \in \mathcal{U}$, $b \in B$ denotes a channel matrix modeling a propagation path from TP b to user u.

The link packing problem is now posed as follows:

$$\max_{\{x_{u,v,b,w} \in \{0,1\}\}} \sum_{u \in u, b \in B, v \in v, w \in w} \theta_{u,v,b,w} x_{u,v,b,w} \quad (2)$$

s.t. $sinr(u, v, b, w) \geq \beta x_{(u,v,b,w)}$, $\forall u \in u, b \in B, v \in v, w \in w$;

$$\sum_{b \in B, v \in V, w \in w} x_{u,v,b,w} \leq 1, \forall u \in u;$$

$$\sum_{u \in u, v \in v} x_{u,v,b,w} \leq 1, \forall b \in B, w \in w;$$

$$\sum_{u \in u, v \in v, w \in w} x_{u,v,b,w} \leq L_b \forall b \in B;$$

Note that the objective in (2) denotes a sum of active communication link weights. The four constraints depicted in (2) are explained as follows:

The first constraint requires that SINRs of all active communication links be at least β, where β is an SINR threshold. This is a constraint of this problem that for each active communication link at least a certain minimum rate (coverage) is ensured.

The second constraint enforces that each user can be scheduled in at most one active communication link. This constraint models a typical scenario where each user has only one radiofrequency (RF) chain due to, e.g., cost constraints.

The third constraint imposes that any (TP, transmit beam) pair, (b, w), can be scheduled in at most one active communication link. This constraint is based on mmWave directional propagation conditions. Indeed, in mmWave systems, each transmit beam is typically matched to one receive beam at a user, which yields a significantly higher receive signal strength compared to other choices of receive beamformers. Then, in such a scenario, since the receive beamformer for all data streams co-scheduled (superposed) on a common transmit beam will be identical, linear processing at the user is not sufficient to overcome a high path loss plus an interference from other co-scheduled streams. Thus, superposing two or more data streams on a same or common transmit beam requires served users to perform successive interference cancellation, which in turn necessitates sophisticated processing by them as well as signaling (from the TPs to each user) of multiple relevant parameters (such as coding rates, modulations, CRC bits) pertaining to other co-scheduled users.

Another constraint requires that a total number of scheduled links in which TP b is a transmitting node cannot exceed a given Lb≥1. This constraint can address a power budget as well as a number of RF chains at each TP. An identical transmit power per beam is assumed. This is mainly for convenience and results derived can be generalized.

A direct approach for solving (2) is thus considered.

SINR constraints can be rewritten as:

$$x_{u,v,b,w} + \sum_{\substack{u' \in u, b' \in B, v' \in v, w' \in w \\ (u',v',b',w') \neq (u,v,b,w)}} x_{u,v,b,w} x_{u',v',b',w'} P \|v^\dagger H_{u,b'} w'\| -$$

$$\frac{P}{\beta} x_{u,v,b,w} \|v^\dagger H_{u,b} w\|^2 \leq 0, \forall\, u, v, b, w.$$

Upon doing so, (2) can be transformed to a binary integer program with a linear objective but with bilinear constraints that are also mixed, since coefficients in the above constraints are both positive and negative. Further, even upon relaxing the binary value constraints, a non-convex optimization problem is obtained.

A first observation is that without loss of optimality, all links for which the SINR threshold β cannot be achieved, are discarded even when no other link is scheduled, e.g., each link (u, v, b, w) such that $P\|v^\dagger H_{u,b} w\|^2 < \beta$ can be safely discarded.

The ground set including all links that remain is denoted by Ψ (e.g., that when active alone can at least equal the SINR threshold).

Further, let $x = [x_{u,v,b,w}]_{\forall (u,v,b,w) \in \Psi}$ denote a vector of indicator variables of all links in Ψ and let θ denote a vector of all their weights. Next, the last three constraints in (2) are collected and represented as the following linear packing constraints (which shall be referred to as dimensionality constraints), $$Dx \leq 1 \qquad (3)$$

Proceeding similarly, it can be deduced that for any link in (u, v, b, w)∈Ψ to be active, it needs to satisfy:

$$\sum_{\substack{u' \in u, b' \in B, v' \in v, w' \in w \\ (u',v',b',w') \in \Psi \setminus (u,v,b,w)}} \frac{\beta}{P\|v^\dagger H_{u,b} w\|^2} + \frac{\beta x_{u',v',b',w'} P\|v^\dagger H_{u,b'} w'\|^2}{P\|v^\dagger H_{u,b} w\|^2} \leq 1 \qquad (4)$$

Thus, $$c_{u',v',b',w'}^{u,v,b,w} = \frac{\beta P \|v^\dagger H_{u,b'} w'\|^2}{P\|v^\dagger H_{u,b} w\|^2},$$

$$\forall\, (u', v', b', w') \neq (u, v, b, w) \in \Psi,$$

$$c_{u,v,b,w}^{u,v,b,w} = \frac{\beta}{P\|v^\dagger H_{u,b} w\|^2} \forall\, (u, v, b, w) \in \Psi$$

A |Ψ|×|Ψ| matrix C is defined with one row for each link in Ψ such that the row corresponding to the link (u, v, b, w) has coefficient $c^{u,v,b,w} = [c_{u',v',b',w'}^{u,v,b,w}]_{\forall (u',v',b',w') \in \Psi}$. Therefore, the condition in (4) for a link to be active can be written as $c^{u,v,b,w} x \leq 1$.

An alternate formulation can now be offered:

$$\max_{x \in \{0,1\}^{|\Psi|}} \theta_x^T, \qquad (5)$$

$$Cx \leq 1;$$

$$Dx \leq 1.$$

The following result reveals the structure in (5) and is a conservative formulation.

In a first proposition, the formulation in (5) is a linear binary integer packing problem and yields a lower bound to (2). For mmWave networks, (5) is also a column sparse packing problem.

The proof is given as: It is seen that (5) has a linear objective and linear constraints in which all coefficients are non-negative (hence linear packing constraints). Note that (5) enforces an SINR constraint for each link in (u, v, b, w)∈Ψ. This SINR constraint is indeed required when the communication link is active, e.g., when $x_{u,v,b,w} = 1$. However, when the communication link is set to be inactive, $x_{u,v,b,w} = 0$, the formulation in (5) still forces satisfaction of an unnecessary constraint $c^{u,v,b,w} x \leq 1$. Consequently, a feasible region of (5) is subsumed by the one in (2), which implies that (5) yields a lower bound to (2).

Notice that each link (u, v, b, w)∈Ψ appears (has a strictly positive coefficient) in only three constraints in D. More importantly, in mmWave networks each link (u, v, b, w)∈Ψ appears in only a few constraints in C as well. The latter assertion holds because each user in a mmWave network can in general receive a sufficiently strong signal strength from only a very few (TP, transmit beam) combinations and for only the appropriately matched receive beamformers. Thus, a link (u, v, b, w)∈Ψ is present as an interferer in only a few SINR constraints involving other users.

Henceforth, unnecessary SINR constraints in (5) due to which optimal solutions of (2) are precluded, are referred to as phantom constraints. In particular, an SINR constraint for a link (u, v, b, w)∈Ψ for which $c^{u,v,b,w} x > 1$ for which for good choices of x that have $x_{u,v,b,w} = 0$, are classified as phantom constraints. Note that these good choices are all feasible with respect to (2) and include each optimal solution to (2) which has the link (u, v, b, w)∈Ψ be inactive. In other words, the SINR constraint for a link (u, v, b, w)∈Ψ in (5) is a phantom constraint if it precludes optimal solutions to (2) in which (u, v, b, w) is inactive. Hence, for any such optimal solution, x̂, a violation $c^{u,v,b,w} \hat{x} > 1$ is presented even though $\hat{x}_{u,v,b,w} = 0$.

There is no a-priori access to the optimal solution set for (2). As a result, the set of good choices include non-optimal solutions as well. Thus, a constraint is deemed to be phantom or not based on necessary conditions. The approach in the following is to resolve as many phantom constraints in (5) as possible, while at the same time retaining the integer packing form of (5).

Towards this end, two steps are offered to address or mitigate the problem of phantom constraints.

This is performed by initializing: C̃ = C and D̃ = D.

Consider a constraint for link (u, v, b, w)∈Ψ enforced by a row $\tilde{c}^{u,v,b,w}$ in C̃. Since each user can be present in at most one active link (a constraint which is enforced by a row in D̃) the following can be set $\tilde{c}_{u',v',b',w'}^{u,v,b,w} = 0, \forall (u', v', b', w') \neq (u, v, b, w) : u' = u$.

In an analogous manner, since each (TP, transmit beam) pair can be present in at most one active link, a constraint that is also enforced by another row in $\tilde{D}$, the following can be set:

$$\tilde{c}_{u',v',b',w'}^{u,v,b,w} = 0, \forall (u',v',b',w') \neq (u,v,b,w) : (b',w') = (b,w).$$

Addressing Type-I incompatibility constraints is now described. After performing the aforementioned procedure, consider the 3 constraints for link $(u, v, b, w) \in \Psi$ enforced by a row $\tilde{c}^{u,v,b,w}$ in $\tilde{C}$.

Suppose there is another link $(u', v', b', w') \in \Psi$ such that $\tilde{c}_{u,v,b,w}^{u,v,b,w} + \tilde{c}_{u',v',b',w'}^{u,v,b,w} > 1$.

Then, clearly the links $(u, v, b, w), (u', v', b', w') \in \Psi$ cannot both be active. Note also that the user and receive beam $u'$, $v'$ in that other communication link are immaterial since interference seen by the link of interest is invariant to them, e.g., the coefficients $\tilde{c}_{u'',v'',b',w'}^{u,v,b,w}$ for all $u''$, $v'': (u'',v'',b',w') \in \Psi$ are identical.

Thus, without loss of optimality, a constraint $x_{u,v,b,w} + \sum_{(u'',v'',b',w') \in \Psi \setminus (u,v,b,w)}^{u'' \in u, v'' \in v} x_{u'',v'',b',w'} \leq 1$ can be introduced as a row in the matrix $\tilde{D}$.

Note that in formulating this constraint, the pair $(b', w')$ can itself be present in at most one active link. Simultaneously, the following is set $\tilde{c}_{u'',v'',b',w'}^{u,v,b,w} = 0$, $\forall (u'',v'',b',w') \in \Psi \setminus (u, v, b, w)$. Moreover, the following is set $$\tilde{c}_{u,v,b,w}^{u'',v'',b',w'} = 0, \forall (u'', v'', b', w') \in \Psi \setminus (u, v, b, w).$$

To summarize, without loss of optimality, a constraint with binary coefficients in $\tilde{D}$ is first introduced that enforces at most one among a set of mutually incompatible links that can be chosen. Then the contribution is removed from any such link to the SINR constraint of any other incompatible link.

Next, after obtaining the matrices $\tilde{C}$, $\tilde{D}$ in hand, the process refers to the constraints enforced by $\tilde{C}$ as SINR constraints and those enforced by $\tilde{D}$ as the expanded dimensionality constraints.

The following problem is now posed:

$$\max_{x \in [0,1]^{|\Psi|}} \theta^T x, \qquad (6)$$

$$\tilde{C}x \leq 1;$$

$$\tilde{D}x \leq 1.$$

In a second proposition, the formulation in (6) is a linear binary integer packing problem that subsumes a feasible region of (5) and yields a lower bound to (2). For mmWave networks (6) is also a column sparse packing problem.

The proof is given as: Note that both the steps performed to obtain matrices $\tilde{C}$ and $\tilde{D}$ ensure that a feasibility with respect to (2) is maintained. Indeed, the expanded dimensionality constraints enforced using $\tilde{D}$ by themselves do not alter the feasible region of (2). However, the SINR constraints in $\tilde{C}$ can still include phantom constraints. Nevertheless, by setting some of the coefficients in these SINR constraints to be zero, the problem of phantom constraints is mitigated and the feasible region compared to (5) is expanded. Next, conditions under which (2) and (6) are equivalent are obtained and an efficient approximation method is provided for the problem in (6).

Regarding certificate of optimality, assume that any two formulations are equivalent if their respective optimal objective values are identical. Thus, if at least one optimal solution of (2) is feasible (and hence optimal) for (6), (2) and (6) are deemed equivalent. To derive conditions under which (2) and (6) are equivalent, let $\Gamma^{u,v,b,w} = \theta^T \tilde{x}$, where $\tilde{x}$ is a feasible solution to (2) with $\tilde{x}_{u,v,b,w} = 0$ (that is obtained using any method at hand).

Examples of such methods are detailed below.

Note that $\Gamma^{u,v,b,w} = 0$, can always be set if a solution is not at hand.

In a third proposition, the formulations in (6) and (2) are equivalent when the following conditions hold.

For every communication link $(u, v, b, w) \in \Psi$, the following is derived:

$$\max_{\substack{x \in [0,1]^{|\Psi|}; x_{u,v,b,w} = 0 \\ \tilde{D}x \leq 1; \theta^T x \geq \Gamma^{u,v,b,w}}} \tilde{c}^{u,v,b,w} x \leq 1. \qquad (7)$$

The proof is given as: consider any link $(u, v, b, w) \in \Psi$ and note that the condition in (7) can be checked by solving a linear program. To show that the condition in (7) is sufficient for the link SINR constraint to not be a phantom constraint, it is assumed that (7) is satisfied. Then, any optimal solution of (2), $\hat{x}$, which has link $(u, v, b, w) \in \Psi$ to be inactive, e.g., $x_{u,v,b,w} = 0$, cannot be precluded by SINR constraint in $\tilde{C}$ corresponding to link $(u, v, b, w) \in \Psi$. This is because $\hat{x}$ is a feasible solution for maximization in (7), from which it can be deduced that $\tilde{c}^{u,v,b,w} \hat{x} \leq 1$. Since this holds for all links in $\Psi$, it can be deduced that the proposition holds true.

Note that while the conditions in (7) are checkable in polynomial time, it is of interest to have conditions that are simpler to check. Towards this end, for each link $(u, v, b, w) \in \Psi$ a row vector, $\bar{c}^{u,v,b,w}$, is defined that is identical to $\tilde{c}^{u,v,b,w}$ except that the following is set $\bar{c}_{u,v,b,w}^{u,v,b,w} = 0$. Then, note that another sufficient condition for (6) and (2) to be equivalent is for the following condition to be satisfied for each link $(u, v, b, w) \in \Psi$.

$$\max_{\substack{x \in [0,1]^{|\Psi|} \\ \tilde{D}x \leq 1}} \bar{c}^{u,v,b,w} x \leq 1. \qquad (8)$$

Let $x_G^{u,v,b,w}$ denote a vector obtained using a classical greedy method to sub-optimally solve the maximization problem in (8). Further, let sum-top-n{.} denote the operator, which returns a sum of the first n elements with the n largest magnitudes in an input non-negative sequence. The following result is offered that outlines readily checkable sufficiency conditions based on the one in (8).

In a fourth proposition, the set of all links in $\Psi$ that satisfy the dimensionality constraints in (8) (or equivalently all binary valued vectors $x : \tilde{D}x \leq 1$) can be expressed as an intersection of three partition matroid constraints. Thus, maximization in (8) is maximization of a modular function subject to three partition matroid constraints.

Consequently, a simple sufficient condition for (6) and (2) to be equivalent is given by:

$$\max_{(u,v,b,w) \in \Psi} \{3 \bar{c}^{u,v,b,w} x_G^{u,v,b,w}\} \leq 1. \qquad (9)$$

Another, sufficient condition for (6) and (2) to be equivalent is given by:

$$\max_{(u,v,b,w)\in\Psi} \min\{A_1^{u,v,b,w}, A_2^{u,v,b,w}, A_3^{u,v,b,w}\} \leq 1, \quad (10)$$

Where $$A_1^{u,v,b,w} = \sum_{u'\in u} \max_{\substack{v'\in B, v'\in v, w'\in w \\ (u',v',b',w')\in\Psi}} \{\bar{c}_{u',v',b',w'}^{u,v,b,w}\},$$

$$A_2^{u,v,b,w} = \sum_{b'\in B, w'\in w} \max_{\substack{u'\in u, v'\in v \\ (u',v',b',w')\in\Psi}} \{\bar{c}_{u',v',b',w'}^{u,v,b,w}\},$$

$$A_3^{u,v,b,w} = \sum_{b'\in B} \text{sum-top} - L_{b u'\in u, v'\in v, w'\in w} \{\bar{c}_{u',v',b',w'}^{u,v,b,w}\}.$$

Note that there are at least three ways in which the ground set of all links $\Psi$ can be partitioned into non-overlapping subsets. The first one partitions $\Psi$ based on distinct users, the second one based on distinct (TP, transmit beam) pairs, and the third one based on distinct TPs. The three types of constraints imposed by D consider these three partitions, respectively, and impose limits on cardinalities of subsets in those partitions. Thus, each type constraint imposed by D is a partition matroid constraint, and hence maximization in (8) is maximization of a modular function subject to three partition matroid constraints.

It can now be deduced that (9) is true since the classical greedy method guarantees a 1=3 approximation factor for maximization in (8). Finally, (10) is true since each one of the three terms $A_1^{u,v,b,w}, A_2^{u,v,b,w}, A_3^{u,v,b,w}$ is an upper bound to the maximization in (8) since it is obtained by solving the maximization problem after dropping two out of the three types of constraints.

The exemplary embodiments of the present invention propose an efficient iterative method to solve (6). In each iteration, this method solves a column sparse integer packing problem, over a ground set $\check{\Psi}$, in order to add to a set of chosen links $\mathcal{G}$, at hand. In particular, $\mathcal{G}$ is a set of all communication links that have been classified active so far and the problem of interest in each iteration is given by, $$\max_{x\in\{0,1\}^{|\check{\Psi}|}} \theta^T x, \quad (11)$$

$$\check{C}x \leq \check{l};$$

$$\check{D}x \leq \check{d}.$$

In a first iteration, the following is set: $\check{\Psi}=\Psi$, $\mathcal{G}=\phi$ (where φ denotes the empty set), with $\check{C}=\tilde{C}$, $\check{D}=\tilde{D}$, $\check{l}=1$ & $\check{d}=1$, where $\tilde{C}$, $\tilde{D}$ are defined as in (6). After obtaining a solution $\check{x}$ to (11), $\mathcal{G}$ is added to all links that have been classified as active in $\check{x}$. Further, the following is updated, $\check{l}\rightarrow\check{l}-\check{C}\check{x}$ and $\check{d}\rightarrow\check{d}-\check{D}\check{x}$. Then, the links selected in $\check{x}$ are removed from $\check{\Psi}$ and the corresponding columns are removed from matrices $\check{C}$, $\check{D}$. In addition, the following two operations are performed before proceeding to the next iteration:

In a pruning step, any link in (u, v, b, w)$\in\check{\Psi}$ that upon being set active violates either the SINR constraints enforced by $\check{C}$, $\check{l}$ for any chosen link in $\mathcal{G}$ or itself, or violates the constraints enforced by $\check{D}$, $\check{d}$, is expurgated from $\check{\Psi}$. In particular, let $\check{y}$ be an $|\check{\Psi}|\times 1$ vector that is zero everywhere but 1 in the position corresponding to link of interest (u, v, b, w).

Then, if the following is true:

$$\check{c}_{u',v',b',w'}^{u,v,b,w}\check{y} > l^{u',v',b',w'} \text{ for any} (u',v',b',w')\in\mathcal{G},$$

Or if the following is true:

$$\check{c}^{u,v,b,w}\check{y} > l^{u,v,b,w},$$

Or if any constraint in the following equation is violated:

$$\check{D}\check{y}\leq\check{d},$$

Then the link of interest is removed from $\check{\Psi}$. The underlying reasoning is that such a link cannot be selected (given that those in $\mathcal{G}$ have been selected) while retaining feasibility.

Type-I incompatibility constraints are addressed as follows: This step is performed after replacing $\Psi$ with $\check{\Psi}$ and $\tilde{C}$, $\tilde{D}$ with $\check{C}$, $\check{D}$, respectively. In addition, for any link of interest (u, v, b, w)$\in\check{\Psi}$, another link (u', v', b', w')$\in\check{\Psi}$ is now deemed incompatible if:

$$\check{c}_{u,v,b,w}^{u,v,b,w} + c_{u',v',b',w'}^{u,v,b,w} > l^{u,v,b,w}.$$

The aforementioned procedure is summarized below. Before commenting on the approximation guarantee of the method, procedures to solve (11) in each iteration are presented. Note that since (11) is a linear binary integer packing problem, there exist approximation methods that offer guarantees which scale inversely with a column-sparsity level. These methods involve solving an LP relaxation of (11) followed by either deterministic oblivious rounding or randomized oblivious rounding. The following optimality result holds for the method presented above.

The method includes a polynomial time algorithm that is monotonic across all iterations. Further, for all input instances for which an optimality certificate can be asserted, the methods offer a $\Omega(1/L^{sparse})$ guarantee with respect to (2), where $L^{sparse}$ is the worst-case column-sparsity in (6) over all such instances. It is noted that LP rounding followed by greedy oblivious rounding yields good solutions to (11).

In this section, a refinement to (6) is presented, which seeks to narrow a gap between (6) and (2) by further mitigating phantom constraints. Clearly, this stage should not be applied if it is found that any one of the conditions in (7) or those in Proposition 4 are satisfied. The refinement described is along the lines of the one used to address Type-I incompatibility constraints and is referred to as addressing Type-II incompatibility constraints.

In particular, the process starts from the formulation in (6) with matrices $\tilde{C}$, $\tilde{D}$ in hand. Then, each row is considered as follows: $\tilde{c}^{u,v,b,w}$ or $\tilde{C}$.

It is then determined whether two distinct (TP, transmit beam) pairs exist, (b', w'), (b", w"), such that the following condition holds:

$$\tilde{c}_{u,v,b,w}^{u,v,b,w} + \tilde{c}_{u',v',b',w'}^{u,v,b,w} + c_{u'',v'',b'',w''}^{u,v,b,w} > 1, \quad (12)$$

Recall that $\tilde{c}_{u',v',b',w'}^{u,v,b,w}$ and $\tilde{c}_{u'',v'',b'',w''}^{u,v,b,w}$ are identical, respectively, for all choices of user and receive beams (u', v') and (u", v"), such that the corresponding 4-tuples (links) are in $\Psi$.

Now, if (12) holds, then this can be deduced from the two distinct (TP, transmit beam) pairs, (b', w'), (b", w"), where at most one can be present in the set of active links, when the link (u, v, b, w) is chosen to be active.

Consequently, the following constraint is added as a row in the matrix $\tilde{D}$.

$$\frac{x_{u,v,b,w}}{2} + \sum_{\substack{u' \in u, v' \in v \\ (u',v',b',w') \in \Psi \setminus (u,v,b,w)}} \frac{x_{u',v',b',w'}}{2} +$$

$$\sum_{\substack{u'' \in u, v'' \in v \\ (u'',v'',b'',w'') \in \Psi \setminus (u,v,b,w)}} \frac{x_{u'',v'',b'',w''}}{2} \leq 1,$$

In addition, row $\tilde{c}^{u,v,b,w}$ of $\tilde{C}$ can be split into two rows. The first row is identical to $\tilde{c}^{u,v,b,w}$ except that all coefficients $\tilde{c}_{u',v',b',w'}^{u,v,b,w}$ that correspond to links in $\Psi$ whose (TP, transmit beam) pair is (b', w') are set to zero. Similarly the second of the two rows is identical to $\tilde{c}^{u,v,b,w}$ except that here all coefficients $\tilde{c}_{u'',v'',b'',w''}^{u,v,b,w}$ that correspond to links in $\Psi$ whose (TP, transmit beam) pair is (b", w") are set to zero. The reasoning used here is that since only one of the two pairs can be present in an active link when the link (u, v, b, w) is active, the SINR constraint can be split into two constraints, each of which accounts for interference from only one of those two (TP, transmit beam) pairs.

Using the matrices $\check{C}$, $\check{D}$ obtained after addressing the Type-II incompatibility constraints, the process can proceed exactly as before by formulating the problem in (6).

Note that since a feasible region has been expanded (while maintaining feasibility with respect to (2)), the conditions in (7) (or those in Proposition 4) are more likely to be satisfied. Finally, the following result is offered to compute an upper bound to the original problem in (2).

In a fifth proposition, an upper bound to (2) can be determined by solving the following LP:

$$\max_{x \in [0,1]^{|\Psi|}} \theta^T x, \quad (13)$$

$$\check{D}x \leq 1.$$

Further, if any of the sufficient conditions in (7) or in Proposition 4 are satisfied, then an upper bound to (2) can be determined by solving the following LP:

$$\max_{x \in [0,1]^{|\Psi|}} \theta^T x, \quad (14)$$

$$\check{C}x \leq 1;$$

$$\check{D}x \leq 1.$$

A tighter upper bound can be obtained if the Type-II incompatibility constraints are addressed as well.

Figure 2:
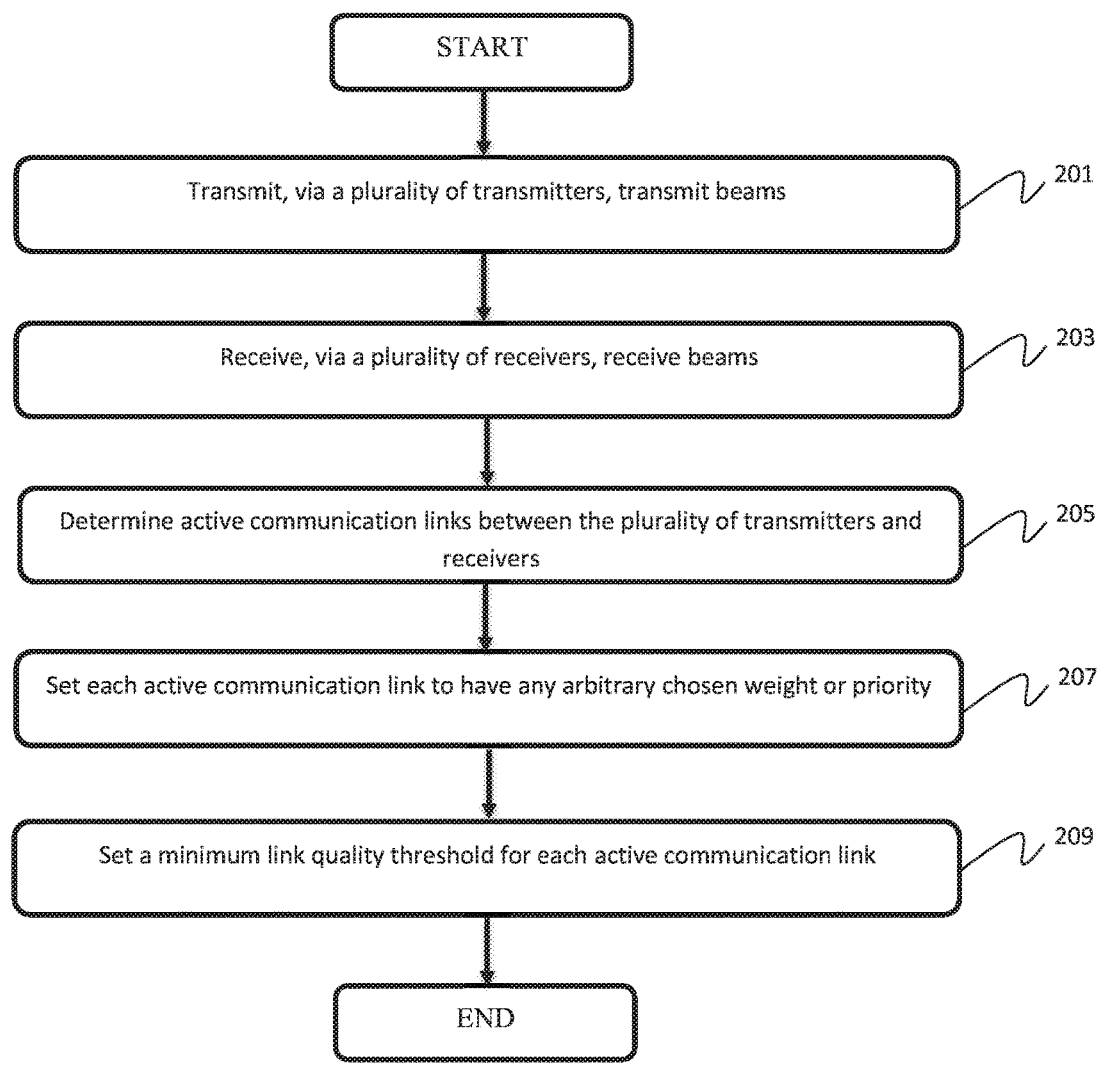
FIG. 2 is a block/flow diagram of a method for establishing communication links in the millimeter wave network of FIG. 1, in accordance with embodiments of the present invention.

FIG. 2 is a block/flow diagram of a method for establishing communication links in the millimeter wave network of FIG. 1, in accordance with embodiments of the present invention.

At block 201, transmit, via a plurality of transmitters, transmit beams.

At block 203, receive, via a plurality of receivers, receive beams.

At block 205, determine active communication links between the plurality of transmitters and receivers.

At block 207, set each active communication link to have any arbitrary chosen weight or priority.

At block 209, set a minimum link quality threshold for each active communication link.

Figure 3:
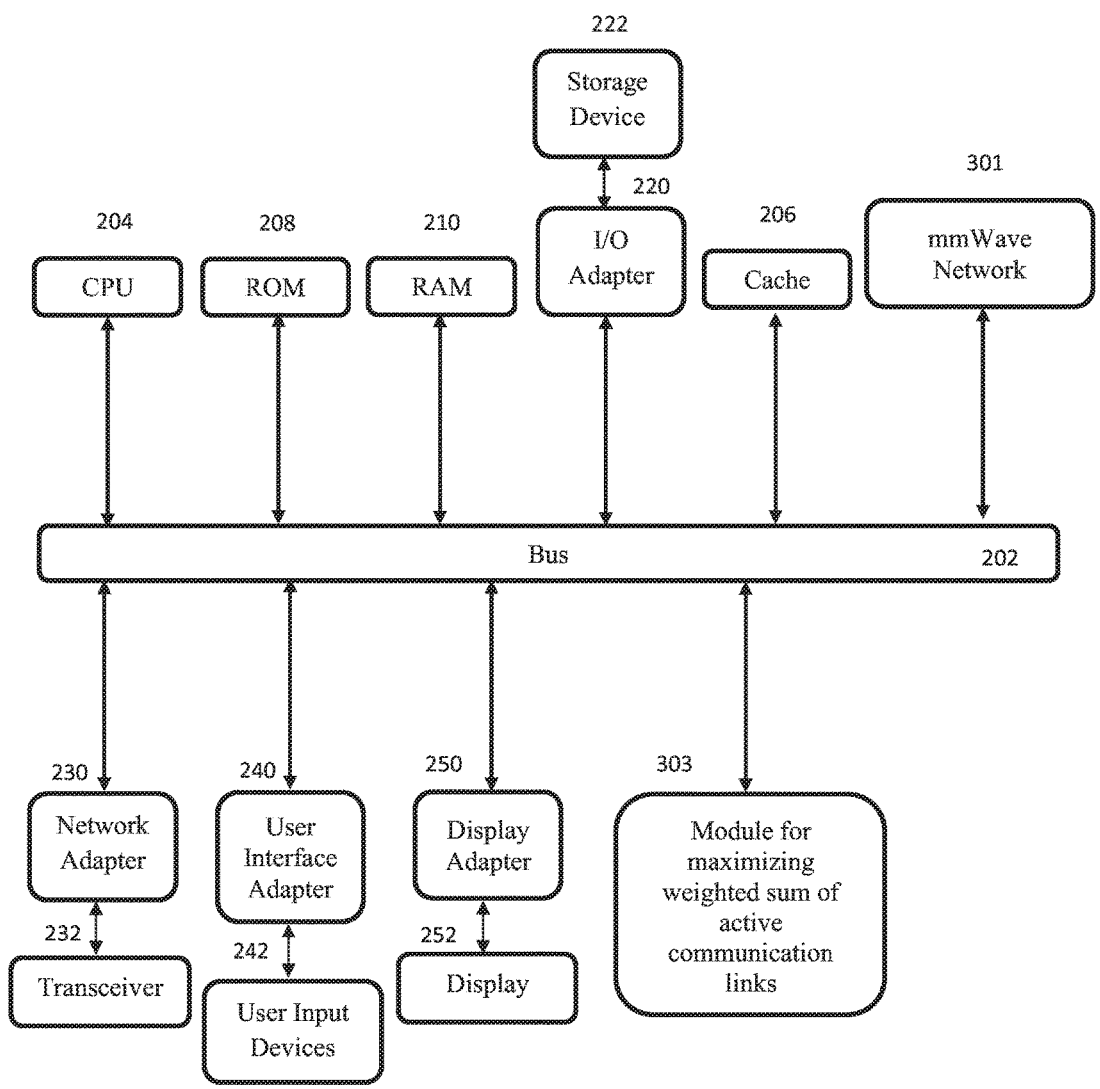
FIG. 3 is an exemplary processing system for establishing communication links in a millimeter wave network, in accordance with embodiments of the present invention.

FIG. 3 is an exemplary processing system for establishing communication links in a millimeter wave network, in accordance with embodiments of the present invention.

The processing system includes at least one processor (CPU) 204 operatively coupled to other components via a system bus 202. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 202. Additionally, mmWave network 201 and block 303 for maximizing a weighted sum of active communication links are operatively coupled to the system bus 202.

A storage device 222 is operatively coupled to system bus 202 by the I/O adapter 220. The storage device 222 can be any of a disk storage device (e.g., a magnetic or optical disk storage device), a solid state magnetic device, and so forth.

A transceiver 232 is operatively coupled to system bus 202 by network adapter 230.

User input devices 242 are operatively coupled to system bus 202 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the processing system.

A display device 252 is operatively coupled to system bus 202 by display adapter 250.

Of course, the mmWave network processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the mmWave network processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for establishing communication links in a millimeter wave (mmWave) network by solving a linear integer packing problem, the method comprising:
   determining active communication links between a plurality of transmitters and a plurality of receivers, each of the communication links represented by a receiving user, a transmitting access point, a transmit beamforming vector, and a receive beamforming vector;
   setting each active communication link to have any arbitrary chosen weight or priority; and
   setting a minimum link quality threshold for each active communication link and subjecting each active communication link to constraints, wherein the constraints include:
      for each active communication link at least a minimum coverage is ensured;

a limit is set on a number of active communication links sharing a common TP;

a limit is set on a number of streams assigned to a TP, transmit beam pair; and a total number of scheduled active communication links in which a TP is a transmitting node does not exceed a predefined threshold, and wherein the link quality threshold is a signal-to-interference-plus-noise ratio (SINR) threshold, the SINR given as:

$$x_{u,v,b,w} + \sum_{\substack{u' \in \mathcal{U}, b' \in \mathcal{B}, v' \in \mathcal{V}, w' \in \mathcal{W} \\ (u',v',b',w') \neq (u,v,b,w)}} x_{u,v,b,w} x_{u',v',b',w'} P \| v^\dagger H_{u,b'} w' \| -$$

$$\frac{P}{\beta} x_{u,v,b,w} \| v^\dagger H_{u,b} w \|^2 \leq 0, \forall u, v, b, w$$

where x is an indicator variable, P is a transmit power, H is a channel matrix, u is a user, w is the transmit beamforming vector, v is the receive beamforming vector, b is the transmitting access point, and $\beta$ is the SINR threshold.

2. The method of claim 1, wherein the plurality of transmitters are transmission points (TPs) and the plurality of receivers are devices of users.

3. The method of claim 1, wherein each active communication link satisfies:

$$\sum_{\substack{u' \in \mathcal{U}, b' \in \mathcal{B}, v' \in \mathcal{V}, w' \in \mathcal{W} \\ (u',v',b',w') \in \Psi \setminus (u,v,b,w)}} \frac{\beta}{\| v^\dagger H_{u,b} w \|^2} + \frac{\beta x_{u',v',b',w'} P \| v^\dagger H_{u,b'} w' \|^2}{P \| v^\dagger H_{u,b} w \|^2} \leq 1$$

where x is an indicator variable, P is a transmit power, H is a channel matrix, u is a user, w is the transmit beamforming vector, v is the receive beamforming vector, b is the transmitting access point, $\beta$ is the SINR threshold, and $\psi$ is remaining communication links.

4. The method of claim 1, wherein the linear integer packing problem is reformulated as:

$$\max_{x \in \{0,1\}^{|\Psi|}} \theta^T x,$$
$$Cx \leq 1;$$
$$Dx \leq 1.$$

where $\theta$ is a vector of all weights, x is an indicator variable, $\psi$ is remaining communication links, D is a matrix of dimensionality constraints, and C is a matrix of SINR constraints.

5. The method of claim 4, wherein a maximum number of entries in each row of matrix C are set to zero and binary-valued packing constraints in the matrix D are minimized.

6. The method of claim 1, wherein blockages due to obstacles in the mmWave network are permitted and factored into an iterative method that considers a sparse binary packing problem.

7. The method of claim 1, wherein detected phantom constraints are mitigated by introducing new constraints with binary coefficients and by modifying one or more existing constraints by setting a number of coefficients within the existing constraints to zero.

8. A system for establishing communication links in a millimeter wave (mmWave) network by solving a linear integer packing problem, the system comprising:

a memory; and a processor in communication with the memory, wherein the processor is configured to:

determine active communication links between a plurality of transmitters and a plurality of receivers, each of the communication links represented by a receiving user, a transmitting access point, a transmit beamforming vector, and a receive beamforming vector;

set each active communication link to have any arbitrary chosen weight or priority; and set a minimum link quality threshold for each active communication link and subject each active communication link to constraints, wherein the constraints include:

for each active communication link at least a minimum coverage is ensured;

a limit is set on a number of active communication links sharing a common TP;

a limit is set on a number of streams assigned to a TP, transmit beam pair; and a total number of scheduled active communication links in which a TP is a transmitting node does not exceed a predefined threshold, and wherein the link quality threshold is a signal-to-interference-plus-noise ratio (SINR) threshold, the SINR given as:

$$x_{u,v,b,w} + \sum_{\substack{u' \in \mathcal{U}, b' \in \mathcal{B}, v' \in \mathcal{V}, w' \in \mathcal{W} \\ (u',v',b',w') \neq (u,v,b,w)}} x_{u,v,b,w} x_{u',v',b',w'} P \| v^\dagger H_{u,b'} w' \| -$$

$$\frac{P}{\beta} x_{u,v,b,w} \| v^\dagger H_{u,b} w \|^2 \leq 0, \forall u, v, b, w$$

where x is an indicator variable, P is a transmit power, H is a channel matrix, u is a user, w is the transmit beamforming vector, v is the receive beamforming vector, b is the transmitting access point, and $\beta$ is the SINR threshold.

9. The system of claim 8, wherein the plurality of transmitters are transmission points (TPs) and the plurality of receivers are devices of users.

10. The system of claim 8, wherein each active communication link satisfies:

$$\sum_{\substack{u' \in \mathcal{U}, b' \in \mathcal{B}, v' \in \mathcal{V}, w' \in \mathcal{W} \\ (u',v',b',w') \in \Psi \setminus (u,v,b,w)}} \frac{\beta}{\| v^\dagger H_{u,b} w \|^2} + \frac{\beta x_{u',v',b',w'} P \| v^\dagger H_{u,b'} w' \|^2}{P \| v^\dagger H_{u,b} w \|^2} \leq 1$$

where x is an indicator variable, P is a transmit power, H is a channel matrix, u is a user, w is the transmit beamforming vector, v is the receive beamforming vector, b is the transmitting access point, $\beta$ is the SINR threshold, and $\psi$ is remaining communication links.

11. The system of claim 8, wherein the linear integer packing problem is reformulated as:

$$\max_{x \in \{0,1\}^{|\Psi|}} \theta^T x,$$
$$Cx \le 1;$$
$$Dx \le 1.$$

where θ is a vector of all weights, x is an indicator variable, ψ is remaining communication links, D is a matrix of dimensionality constraints, and C is a matrix of SINR constraints.

12. The system of claim 11, wherein a maximum number of entries in each row of matrix C are set to zero and binary-valued packing constraints in the matrix D are minimized.

13. The system of claim 8, wherein blockages due to obstacles in the mmWave network are permitted and factored into an iterative method that considers a sparse binary packing problem.

14. The system of claim 8, wherein detected phantom constraints are mitigated by introducing new constraints with binary coefficients and by modifying one or more existing constraints by setting a number of coefficients within the existing constraints to zero.

15. A non-transitory computer-readable storage medium comprising a computer-readable program for establishing communication links in a millimeter wave (mmWave) network by solving a linear integer packing problem, wherein the computer-readable program when executed on a computer causes the computer to perform the steps of:

determining active communication links between a plurality of transmitters and a plurality of receivers, each of the communication links represented by a receiving user, a transmitting access point, a transmit beamforming vector, and a receive beamforming vector;

setting each active communication link to have any arbitrary chosen weight or priority; and setting a minimum link quality threshold for each active communication link and subjecting each active communication link to constraints, wherein the constraints include:

for each active communication link at least a minimum coverage is ensured;

a limit is set on a number of active communication links sharing a common TP;

a limit is set on a number of streams assigned to a TP, transmit beam pair; and a total number of scheduled active communication links in which a TP is a transmitting node does not exceed a predefined threshold, wherein the link quality threshold is a signal-to-interference-plus-noise ratio (SINR) threshold, the SINR given as:

$$x_{u,v,b,w} + \sum_{\substack{u' \in \mathcal{U}, b' \in \mathcal{B}, v' \in \mathcal{V}, w' \in \mathcal{W} \\ (u',v',b',w') \ne (u,v,b,w)}} x_{u,v,b,w} x_{u',v',b',w'} P \|v^\dagger H_{u,b'} w'\| -$$
$$\frac{P}{\beta} x_{u,v,b,w} \|v^\dagger H_{u,b} w\|^2 \le 0, \forall u, v, b, w$$

where x is an indicator variable, P is a transmit power, H is a channel matrix, u is a user, w is the transmit beamforming vector, v is the receive beamforming vector, b is the transmitting access point, and β is the SINR threshold.

16. The non-transitory computer-readable storage medium of claim 15, wherein detected phantom constraints are mitigated by introducing new constraints with binary coefficients and by modifying one or more existing constraints by setting a number of coefficients within the existing constraints to zero.

17. The non-transitory computer-readable storage medium of claim 15, wherein each active communication link satisfies:

$$\sum_{\substack{u' \in \mathcal{U}, b' \in \mathcal{B}, v' \in \mathcal{V}, w' \in \mathcal{W} \\ (u',v',b',w') \in \Psi \setminus (u,v,b,w)}} \frac{\beta}{\|v^\dagger H_{u,b} w\|^2} + \frac{\beta x_{u',v',b',w'} P \|v^\dagger H_{u,b'} w'\|^2}{P \|v^\dagger H_{u,b} w\|^2} \le 1$$

where x is an indicator variable, P is a transmit power, H is a channel matrix, u is a user, w is the transmit beamforming vector, v is the receive beamforming vector, b is the transmitting access point, β is the SINR threshold, and ψ is remaining communication links.

18. The non-transitory computer-readable storage medium of claim 15, wherein the linear integer packing problem is reformulated as:

$$\max_{x \in \{0,1\}^{|\Psi|}} \theta^T x,$$
$$Cx \le 1;$$
$$Dx \le 1.$$

where θ is a vector of all weights, x is an indicator variable, ψ is remaining communication links, D is a matrix of dimensionality constraints, and C is a matrix of SINR constraints.

* * * * *